United States Patent
Hwang et al.

(10) Patent No.: US 12,344,287 B2
(45) Date of Patent: Jul. 1, 2025

(54) LUGGAGE LOADING DEVICE FOR MOBILITY AND LUGGAGE LOADING METHOD FOR MOBILITY USING THE SAME

(71) Applicants: Hyundai Motor Company, Seoul (KR); Kia Corporation, Seoul (KR)

(72) Inventors: Jin Ho Hwang, Cheonan-si (KR); Dong Eun Cha, Hwaseong-si (KR); Sang Heon Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 617 days.

(21) Appl. No.: 17/692,567

(22) Filed: Mar. 11, 2022

(65) Prior Publication Data
US 2023/0054338 A1    Feb. 23, 2023

(30) Foreign Application Priority Data

Aug. 17, 2021    (KR) .................. KR10-2021-0108314

(51) Int. Cl.
| | | |
|---|---|---|
| *B61D 47/00* | (2006.01) | |
| *B65G 13/02* | (2006.01) | |
| *B65G 13/12* | (2006.01) | |
| *B65G 39/02* | (2006.01) | |
| *B65G 39/10* | (2006.01) | |
| *B65G 41/00* | (2006.01) | |
| *B65G 67/20* | (2006.01) | |

(52) U.S. Cl.
CPC ........... *B61D 47/005* (2013.01); *B65G 13/02* (2013.01); *B65G 13/12* (2013.01); *B65G 39/025* (2013.01); *B65G 39/10* (2013.01); *B65G 41/003* (2013.01); *B65G 67/20* (2013.01); *B65G 2203/0233* (2013.01)

(58) Field of Classification Search
CPC ...... B65G 67/20; B65G 41/003; B65G 13/02; B60P 3/20; B61D 47/005
See application file for complete search history.

(56) References Cited

U.S. PATENT DOCUMENTS

| | | | |
|---|---|---|---|
| 10,913,467 B2 | 2/2021 | Ascani et al. | |
| 10,988,069 B2 * | 4/2021 | Vincent | B65G 13/02 |
| 2015/0291356 A1 * | 10/2015 | Oki | B65G 1/1378 414/807 |
| 2020/0154949 A1 * | 5/2020 | Klein | H02J 3/38 |
| 2022/0297939 A1 * | 9/2022 | Chen | B60P 1/6436 |

FOREIGN PATENT DOCUMENTS

| | | |
|---|---|---|
| KR | 10-0680599 B1 | 2/2007 |
| KR | 10-2023250 B1 | 9/2019 |
| KR | 10-2020-0127835 A | 11/2020 |

* cited by examiner

*Primary Examiner* — Saul Rodriguez
*Assistant Examiner* — Willie W Berry, Jr.
(74) *Attorney, Agent, or Firm* — Morgan, Lewis & Bockius LLP

(57) ABSTRACT

The present disclosure discloses a luggage loading device for mobility capable of improving loading convenience by automating the loading and arrangement of a luggage inside the loading space of the mobility, and a luggage loading method for mobility using the same.

15 Claims, 10 Drawing Sheets

LUGGAGE LOADING DEVICE FOR MOBILITY AND LUGGAGE LOADING METHOD FOR MOBILITY USING THE SAME

CROSS REFERENCE TO RELATED APPLICATION

The present application claims priority to Korean Patent Application No. 10-2021-0108314, filed Aug. 17, 2021, the entire contents of which is incorporated herein for all purposes by this reference.

TECHNICAL FIELD

The present disclosure relates to a luggage loading device for mobility that secures the convenience of loading luggage inside a mobility and automates the arrangement of loaded luggage in providing a delivery service utilizing the mobility, and to a luggage loading method for mobility using the same.

BACKGROUND

With the recent development of technology, various mobilities are being developed in order to transfer passengers to destinations more conveniently and quickly.

That is, conventionally, passengers who want to move have moved to a desired place by using a private car or public transportation, but the technology for providing a mobility service to passengers through autonomous driving mobility is being developed.

In addition, a delivery service using a mobility is being developed. That is, as the mobility is configured to enable autonomous driving, the mobility is moved to a specific area through autonomous driving while luggage is loaded in the mobility, so that the luggage can be delivered.

However, in order to load and arrange luggage inside the mobility before delivery service using the mobility, it is required to load the luggage by a person or machine.

That is, in order to load luggage inside the mobility, a person or a machine enters the inside the mobility and loads and arranges the luggage, and such work must be repeated, so the convenience for loading luggage inside the mobility is not considered.

The matters described as the background art above are only for improving the understanding of the background of the present disclosure, and should not be accepted as acknowledging that they correspond to the prior art already known to those of ordinary skill in the art.

SUMMARY

The present disclosure has been proposed to solve this problem, and it is an object of the present disclosure to provide a luggage loading device for mobility that can secure the convenience of loading luggage into the mobility and automate the arrangement of loaded luggage, and a luggage loading method for mobility using the same.

In order to achieve the above object, the luggage loading device for mobility according to the present disclosure includes a mobility that is provided with a loading space capable of loading luggage; a first moving module that is installed on a bottom surface of the loading space to move the luggage to be put into or taken out of the loading space on the bottom surface; a loading panel that exposes the first moving module while covering the bottom surface of the loading space, and loads the put luggage; and a second moving module that is provided in the loading space, is connected to the loading panel and is configured to move the connected loading panel in a vertical direction so that the loading panel loaded with the luggage is aligned vertically.

The first moving module includes a ball housing having a seating groove at a top, and a support ball that is seated in the seating groove of the ball housing and moves in a rolling motion in the seating groove.

The first moving module further includes a ball cover on which a through hole matched with the seating groove and opened to surround a portion of the support ball is provided, so that when coupled to the top of the ball housing, the support ball is prevented from being separated from the seating groove.

The loading panel includes a plurality of opening holes which are respectively matched to a plurality of the first moving modules and through which the support balls of the respective first moving modules pass.

The first moving module is composed of a plurality of first moving modules and the first moving modules are arranged spaced apart on the bottom surface of the loading space.

The first moving module includes a roll housing that extends in a direction perpendicular to a direction in which the luggage is put in or taken out of the loading space and has a recessed groove at the top along the extension direction, and a roller that is seated in the recessed groove of the roll housing and moves in a rolling motion in the recessed groove.

The loading space is provided with a driving module that is connected to an end of the roller and rotates the roller when the driving module operates.

The first moving module further includes a roll cover on which a slit hole matched with the recessed groove and opened to surround a portion of the roller is provided so that when coupled to a top, the roller is prevented from being separated from the recessed groove.

A plurality of opening holes which are respectively matched to a plurality of the first moving modules and through which the rollers of the respective first moving modules pass are provided on the loading panel.

The first moving module is composed of a plurality of first moving modules and the first moving modules are arranged to be spaced apart in the loading space in a direction in which the luggage is put or taken out.

The second moving module includes a plurality of guide rails that are provided on an inner wall forming the loading space of the mobility and extends in a vertical direction, and a plurality of moving modules that are movably installed along the guide rails and are connected to the loading panel.

The loading panel is composed of a plurality of loading panels and the loading panels are stacked in the vertical direction, and the moving module of the second moving module is composed of a plurality of moving modules so as to be connected to the respective loading panels.

In the mobility, a sensor is provided on an uppermost end of the loading space or on a bottom of each loading panel to measure a distance between the uppermost end and the luggage at a lower side or between the loading panel and other loading panel, and when the second moving module moves the loading panel in the vertical direction, if the distance between the uppermost end of the loading space and the luggage or the distance between the loading panel and the luggage measured by the sensor unit is less than a set distance, the second moving module stops the movement of the corresponding loading panel.

On the other hand, the luggage loading method for operating a luggage loading device for mobility according to the present disclosure includes a setting step of setting a loading order according to information of luggage; a loading step of loading each luggage into loading space by a first moving module according to the loading order; and an arrangement step of controlling a second moving module to move a loading panel loaded with the luggage upward when a bottom surface of the loading space is saturated with the luggage.

The setting step includes setting the loading order according to a size of the luggage and a delivery order of the luggage.

When the loading panel is composed of a plurality of loading panels and the loading panels are stacked in the vertical direction. The arrangement step further includes: if a distance between an uppermost end of the loading space and the luggage or a distance between the loading panel and the luggage is less than a set distance based on information according to the distance between the uppermost end of the loading space and the luggage or the distance between the loading panel and the luggage, stopping a movement of the corresponding loading panel.

The luggage loading device for mobility having the structure as described above and the luggage loading method for mobility using the same can improve loading convenience by automating the loading and arrangement of luggage in the loading space of mobility.

DETAILED DESCRIPTION OF THE DISCLOSURE

Hereinafter, a luggage loading device for mobility and a luggage loading method for mobility using the same according to a preferred embodiment of the present disclosure will be described with reference to the accompanying drawings.

Figure 1:
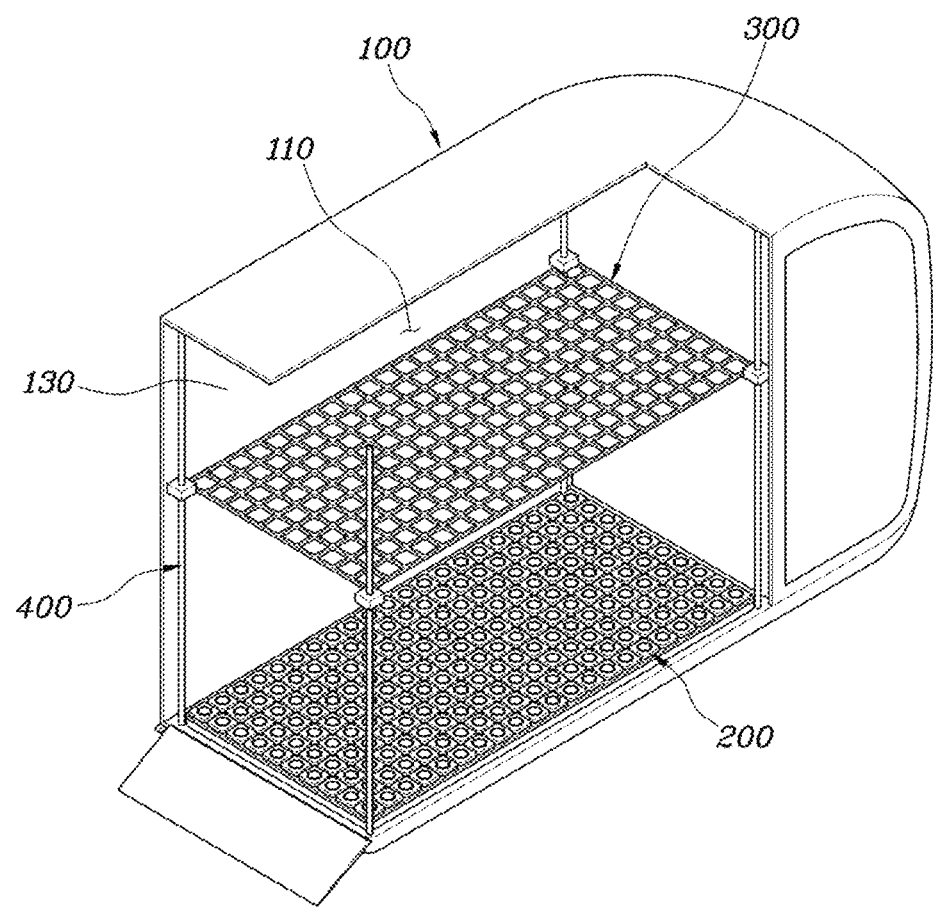
FIG. 1 is a view showing a luggage loading device for mobility according to the present disclosure.
Figure 2:
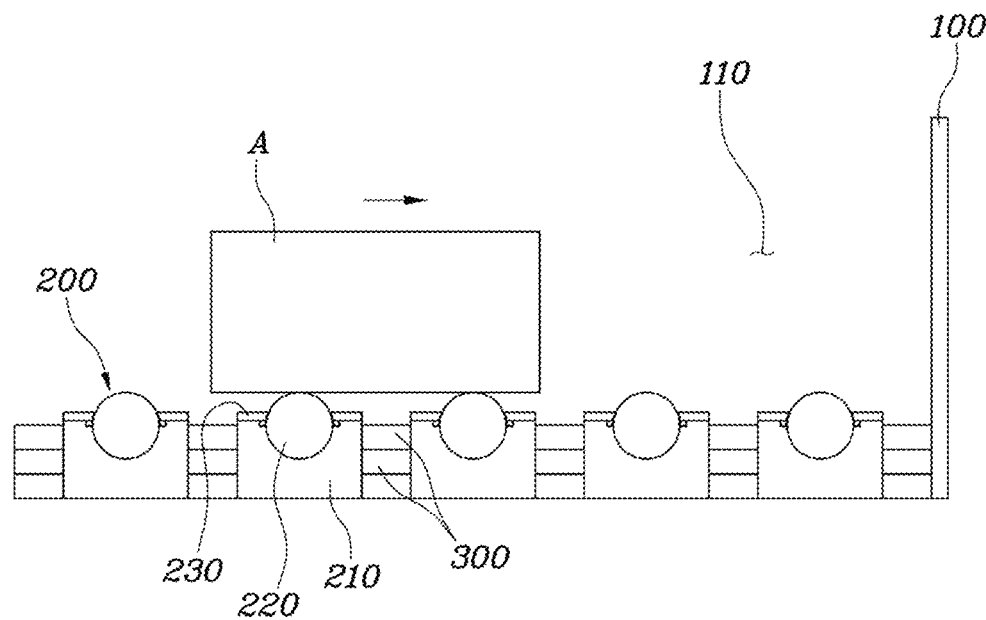
FIG. 2 is a view showing a first moving module according to an embodiment of the present disclosure.
Figure 3:
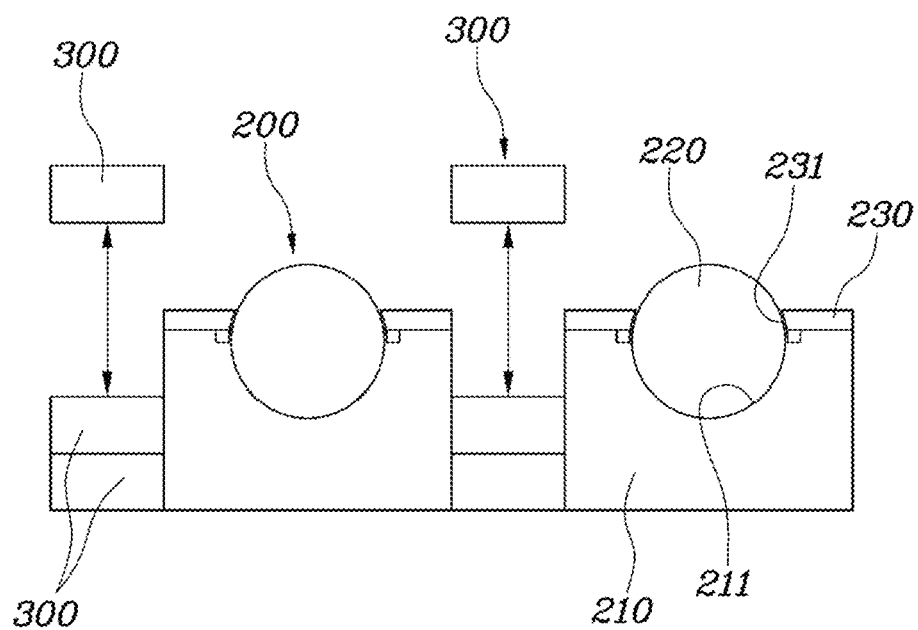
FIG. 3 is a view for explaining an operation of a loading panel in a first moving module according to an embodiment of the present disclosure.
Figure 4:
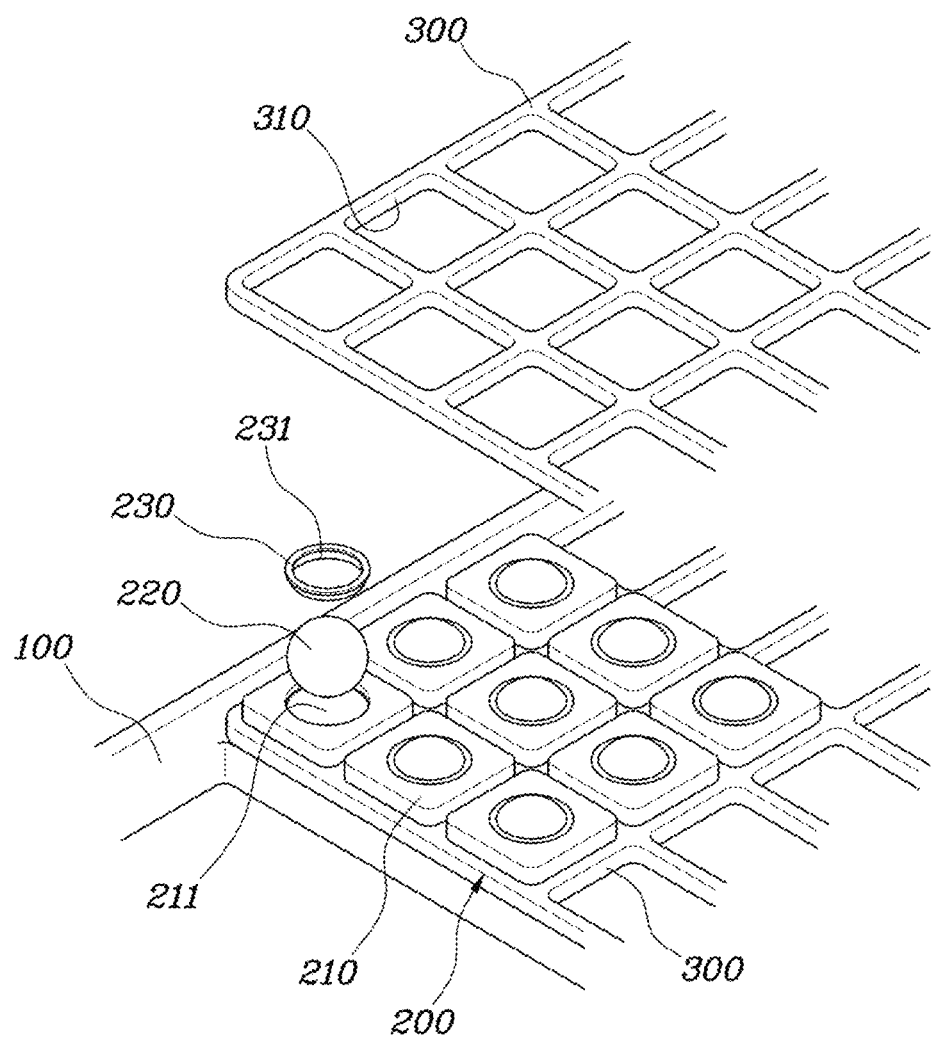
FIG. 4 is a view showing a luggage loading device for mobility according to an embodiment of the present disclosure.
Figure 5:
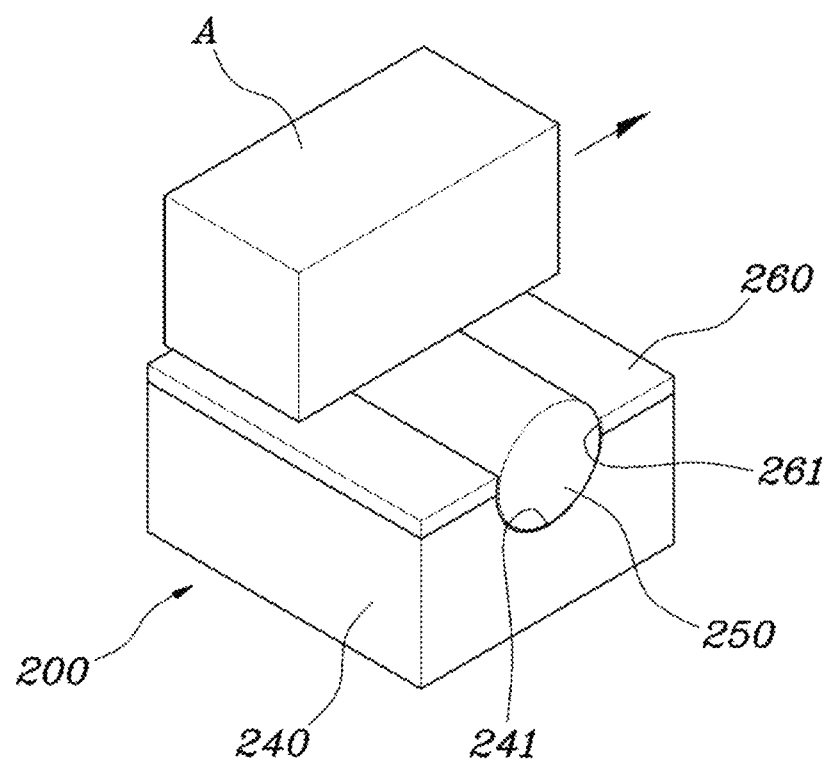
FIG. 5 is a view showing a first moving module according to another embodiment of the present disclosure.
Figure 6:
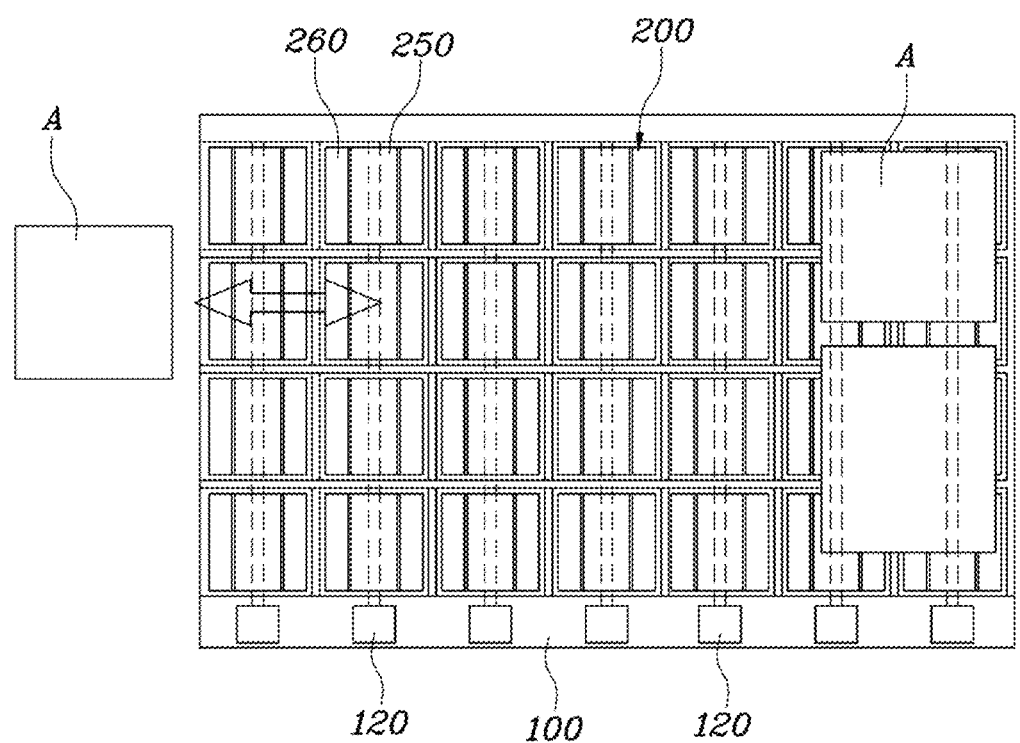
FIG. 6 is a view for explaining an operation of a first moving module according to another embodiment of the present disclosure.
Figure 7:
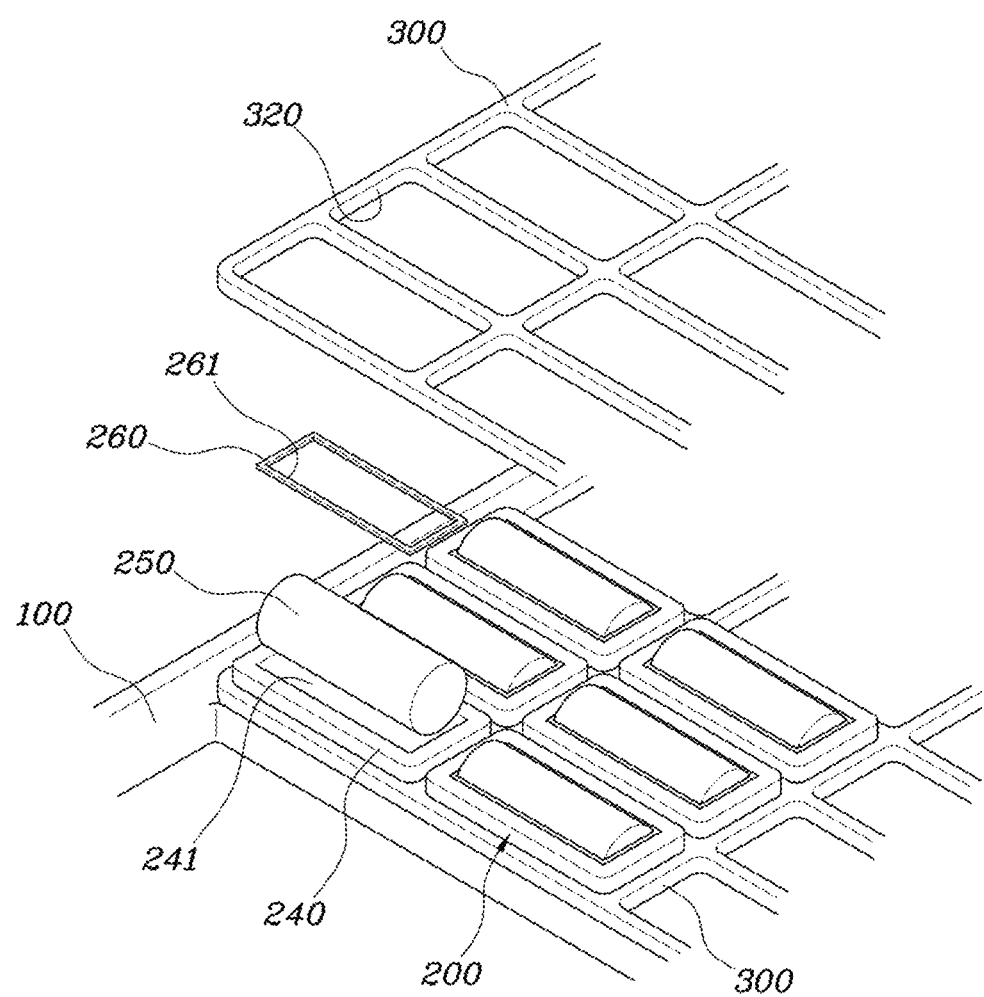
FIG. 7 is a view showing a luggage loading device for mobility according to another embodiment of the present disclosure.
Figure 8:
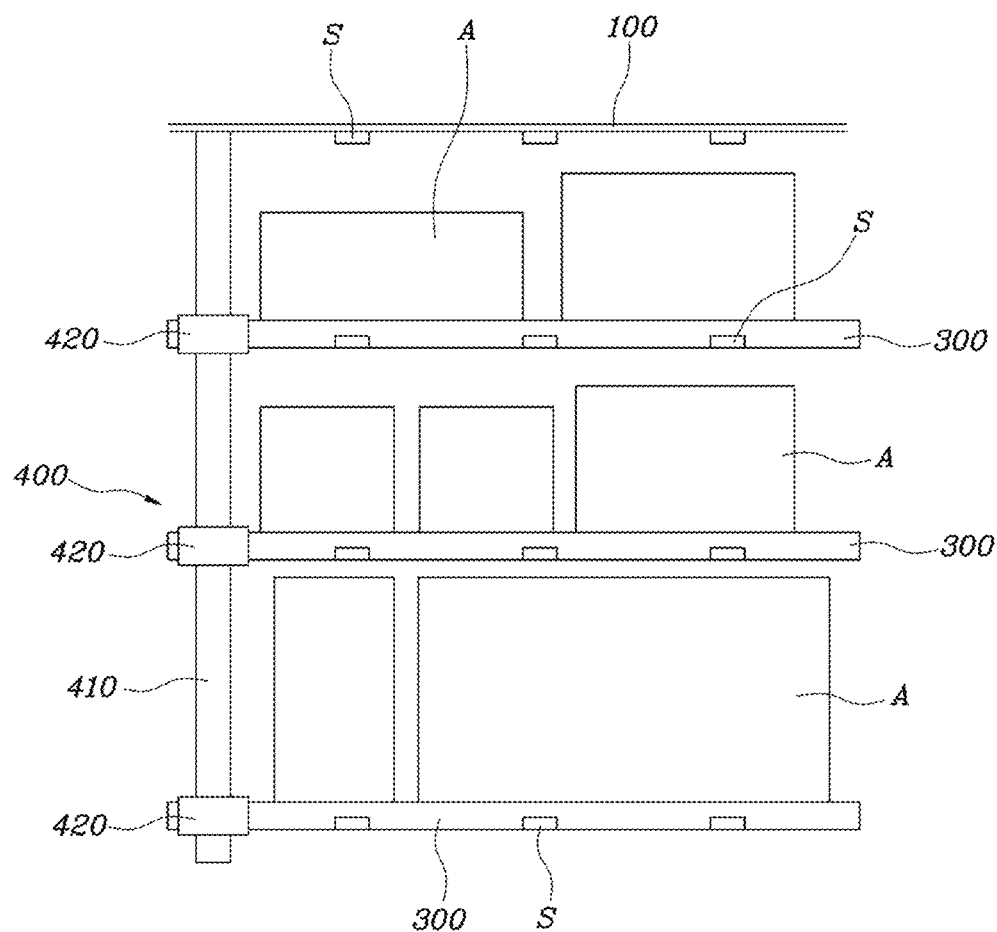
FIG. 8 is a view for explaining a second moving module according to an embodiment of the present disclosure.
Figure 9:
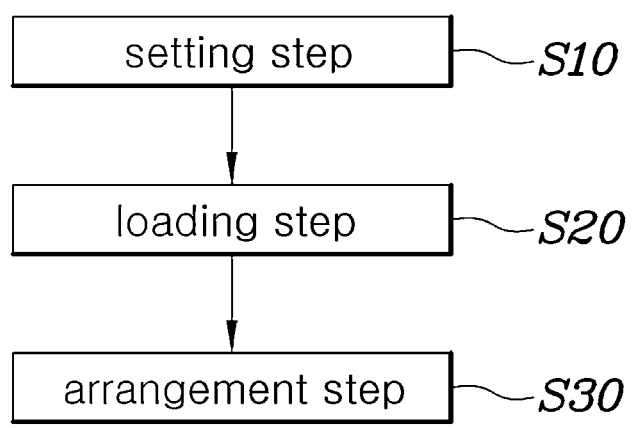
FIG. 9 is a flowchart of a luggage loading method for mobility according to the present disclosure.
Figure 10:
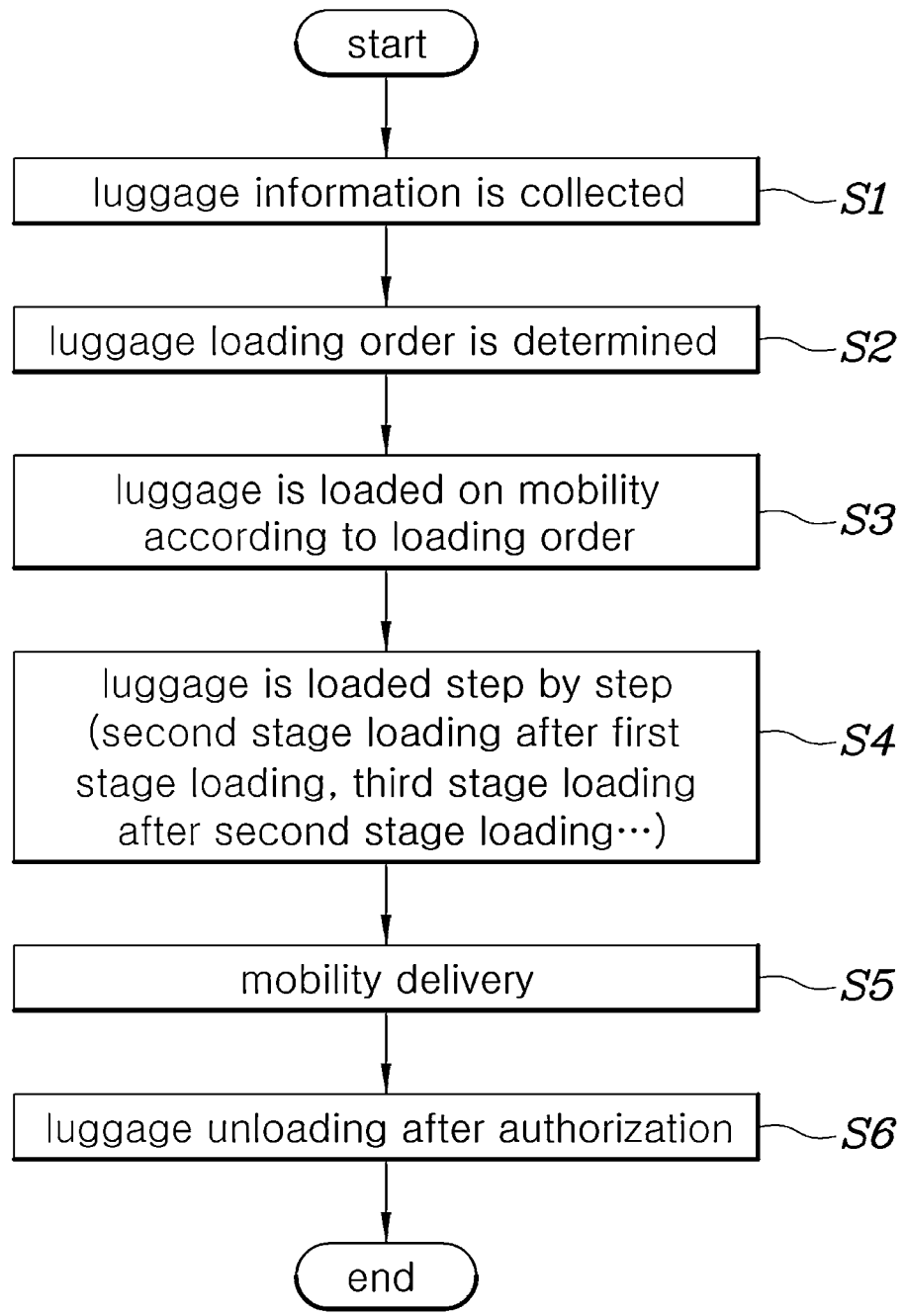
FIG. 10 is a flowchart of a luggage loading method for mobility according to an embodiment of the present disclosure.

FIG. 1 is a view showing a luggage loading device for mobility according to the present disclosure, FIG. 2 is a view showing a first moving module according to an embodiment of the present disclosure, FIG. 3 is a view for explaining an operation of a loading panel in a first moving module according to an embodiment of the present disclosure, FIG. 4 is a view showing a luggage loading device for mobility according to an embodiment of the present disclosure, FIG. 5 is a view showing a first moving module according to another embodiment of the present disclosure, FIG. 6 is a view for explaining an operation of a first moving module according to another embodiment of the present disclosure, FIG. 7 is a view showing a luggage loading device for mobility according to another embodiment of the present disclosure, FIG. 8 is a view for explaining a second moving module according to an embodiment of the present disclosure, FIG. 9 is a flowchart of a luggage loading method for mobility according to the present disclosure, and FIG. 10 is a flowchart of a luggage loading method for mobility according to an embodiment of the present disclosure.

As shown in FIG. 1, a luggage loading device for mobility according to the present disclosure includes a mobility 100 that is provided with a loading space 110 capable of loading luggage A; a first moving module 200 that is installed on a bottom surface of the loading space 110 to move the luggage A to be put into or taken out of the loading space 110 on the bottom surface; a loading panel 300 that is formed to expose the first moving module 200 upward while covering the bottom surface of the loading space 110, and loads the put luggage A; and a second moving module 400 that is provided in the loading space 110, is connected to the loading panel 300, and is configured to move the connected loading panel 300 in a vertical direction so that the respective loading panel 300 loaded with the luggage A is aligned vertically.

The mobility 100 is provided with the loading space 110 capable of loading the luggage A, and is equipped with an autonomous driving function (or an autonomous driving program) to move to a specific area.

This mobility 100 can put into or take out of the luggage A in the loading space 110 as any one portion is opened and closed in the circumferential surface thereof. The mobility 100 according to an embodiment of the present disclosure is configured so that the luggage A can be loaded to the rear.

In the loading space 110 of the mobility 100, the first moving module 200 is installed on the bottom surface of the loading space 110. The first moving module 200 is configured to support the movement of the luggage A when the luggage A is put into or taken out of the loading space 110.

That is, in a state in which the first moving module 200 is installed on the bottom surface of the loading space 110, the first moving module 200 makes the luggage A slidably moved to support the movement of the luggage or makes the luggage A forcibly moved.

This first moving module 200 may be applied in various embodiments.

As shown in FIGS. 2 to 3, the first moving module 200 according to an embodiment may be configured to include a ball housing 210 having a seating groove 211 formed at a top, and a support ball 220 that is seated in the seating groove 211 of the ball housing 210 and moves in a rolling motion in the seating groove 211.

As such, the ball housing 210 is installed on the bottom surface of the loading space 110, and the seating groove 211 in which the support ball 220 is seated is formed on the top of the ball housing. Accordingly, when the luggage A is seated on the upper side of the ball housing 210, the support ball 220 is in point contact with the luggage A to support the luggage A so that the luggage A can be moved by the rolling motion of the support ball 220. A bearing structure may be further applied to the seating groove 211 of the ball housing 210 to assist the rolling motion of the support ball 220.

In addition, the first moving module 200 may be configured to further include a ball cover 230 on which a through hole 231 matched with the seating groove 211 and opened to surround a portion of the support ball 220 is formed, so that when coupled to the top of the ball housing 210, the support ball 220 is prevented from being separated from the seating groove 211.

That is, the ball cover 230 is coupled to the top of the ball housing 210, and the through hole 231 matching the seating groove 211 when coupled to the ball housing 210 is formed in the ball cover 230 so that the support ball 220 is exposed upward through the through hole 231. In particular, the through hole 231 of the ball cover 230 is formed to surround the support ball 220 and the diameter of the through hole 231 is smaller than the diameter of the support ball 220 so that the support ball 220 is not separated through the through hole 231.

The first moving module 200 is composed of a plurality of modules and the first moving modules 200 are arranged spaced apart on the bottom surface of the loading space 110.

As such, the first moving modules 200 according to an embodiment are arranged on the bottom surface of the loading space 110, so that the luggage A that is put into the loading space 110 of the mobility 100 can be moved on the bottom surface of the loading space 110 by the first moving modules 200. In addition, as the first moving modules 200 are arranged on the bottom surface, the luggage A on the bottom surface of the loading space 110 can be moved in a balanced manner without being unilateral to either side.

Accordingly, as shown in FIG. 4, the loading panel 300 include the plurality of opening holes 310 which are respectively matched to the plurality of first moving modules 200 and through which the support balls 220 of the respective first moving modules 200 pass. That is, the loading panel 300 is formed to cover the bottom surface of the loading space 110, and includes the opening hole 310 that is formed in a portion matching the first moving module 200 to expose the first moving module 200 upward.

In this way, the loading panel 300 is formed to cover the bottom surface of the loading space 110, and the first moving module 200 is exposed upward through the opening hole 310, so that when the luggage A is put into or taken out of the loading space 110, the movement is supported by the first moving module 200, and when the loading of the luggage A is completed, the loading panel 300 is vertically moved by the second moving module 400 so that the luggage A is arranged upward.

In particular, the loading panel 300 is composed of a plurality of panels and the loading panels 300 are configured to be stacked in the vertical direction, so that the respective loading panels 300 are moved in the vertical direction by the second moving module 400 to make the loading space 110 into a plurality of pieces, so that the luggage A is vertically arranged.

On the other hand, the first moving module 200 according to another embodiment, as shown in FIGS. 5 to 6, is configured to include a roll housing 240 that extends in a direction perpendicular to a direction in which the luggage A is put into or taken out of the loading space 110 and has a recessed groove 241 formed at the top along the extension direction, and a roller 250 that is seated in the recessed groove 241 of the roll housing 240 and moves in a rolling motion in the recessed groove 241.

As such, the roll housing 240 is installed on the bottom surface of the loading space 110, and the recessed groove 241 in which the roller 250 is seated is formed at the top of the roll housing 240. In particular, as the roller 250 is formed to extend in a direction perpendicular to the direction in which the luggage A is put or taken, the roll housing 240 also extends in the same direction as the extension direction of the roller 250. Accordingly, the recessed groove 241 of the roll housing 240 is formed to extend laterally to match the roller 250.

For this reason, when the luggage A is upwardly seated on the roll housing 240, the roller 250 is in line contact with the luggage A to support the luggage A, and the luggage A can be moved by the rotational motion of the roller 250. A bearing structure may be further applied to the recessed groove 241 of the roll housing 240 to assist the rotational movement of the roller 250.

In addition, the first moving module 200 is configured to further include a roll cover 260 on which a slit hole 261 matched with the recessed groove 241 and opened to surround a portion of the roller 250 is formed, so that when coupled to the top of the roll housing 240, the roller 250 is prevented from being separated from the recessed groove 241.

That is, the roll cover 260 is coupled to the top of the roll housing 240, and the slit hole 261 matching the recessed groove 241 when coupled to the roll housing 240 is formed in the roll cover 260. Thus, the roller 250 is exposed upward through the slit hole 261. In particular, the slit hole 261 of the roll cover 260 is formed to surround the roller 250 and the diameter of the slit hole 261 is smaller than the diameter of the roller 250 to prevent the roller 250 from being separated through the slit hole 261.

The first moving module 200 according to this other embodiment is composed of a plurality of modules and the first moving modules 200 are arranged to be spaced apart in the loading space 110 in the direction in which the luggage A is put or taken out.

As such, the first moving modules 200 are arranged to be spaced apart on the bottom surface of the loading space 110 in the direction in which the luggage A is put or taken out, so that the luggage A that is put into the loading space 100 of the mobility 100 may be linearly moved on the bottom surface of the loading space 110 by the first moving module 200. Thus, according to the rotation direction of the roller 250 of the first moving module 200 in the loading space 110 of the mobility 100, the loading or unloading of the luggage A can be automated.

On the other hand, the loading space 110 is provided with a driving module 120 that is connected to the end of the roller 250 and rotates the roller 250 during the operation of the driving module 120.

In the mobility 100, the driving module 120 is installed on the inner wall forming the loading space 110, and the end of the roller 250 is connected to the driving module 120, so that the roller 250 rotates depending on whether the driving module 120 operates. That is, as the roller 250 is formed to extend in the lateral direction, it can be connected to the driving module 120 installed on the inner wall, and the driving module 120 is composed of a motor capable of forward and reverse rotation and rotate the roller 250 depending on whether it operates.

For this reason, the luggage A that is put into the loading space 110 is moved to the inside the loading space 110 by the rotation of the roller 250 due to the operation of the driving module 120, so that the convenience of loading the luggage A is improved.

The driving module 120 may be connected to each of the plurality of rollers 250, and may be configured to be connected to only some of the rollers 250 among the plurality of rollers 250.

On the other hand, as shown in FIG. 7, a plurality of opening holes 320 which is matched to the plurality of first moving modules 200 and through which the rollers 250 of the respective first moving modules 200 pass is formed on the loading panel 300. The opening holes 320 may be formed to extend laterally as they are formed to match the rollers 250 of the first moving modules 200.

In this way, the loading panel 300 is formed to cover the bottom surface of the loading space 110, and the first moving module 200 is exposed upward through the opening hole 320. Thus, when the luggage A is put into or taken out of the loading space 110, the movement is supported by the first moving module 200, and when the loading of the luggage A is completed, the loading panel 300 is vertically moved by the second moving module 400 so that the luggage A is arranged upward.

In particular, the loading panel 300 is composed of a plurality of loading panels and the loading panels are configured to be stacked in the vertical direction, so that the respective loading panels 300 are moved in the vertical direction by the second moving module 400 to make the loading space 110 into a plurality of pieces, so that the luggage A can be vertically arranged.

On the other hand, the second moving module 400 is configured to include a plurality of guide rails 410 that is provided on the inner wall forming the loading space 110 of the mobility 100, and extends in the vertical direction, and moving modules 420 that are movably installed along the guide rails 410 and are connected to the loading panel 300.

As shown in FIGS. 1 and 8, the second moving module 400 includes the guide rails 410 and the moving modules 420.

The plurality of guide rails 410 may be provided on the inner wall in the loading space 110 of the mobility 100, and they are provided on the edge ends of the inner wall or the corners of the loading space 110 so as not to interfere with the luggage A that is put into or taken out of the loading space 110.

The moving module 420 is movably installed in the guide rail 410 along the guide rail 410. Accordingly, the guide rail 410 is composed of a screw, and the moving module 420 is composed of a step motor engaged with the screw of the guide rail 410 so that the moving module 420 can be configured to be moved on the guide rail 410.

In particular, the moving module 420 is connected to the loading panel 300 so that the loading panel 300 is moved along the guide rail 410. Here, when the loading panel 300 is composed of a plurality of panels, the moving module 420 is composed of a plurality of moving modules so as to be connected to the respective loading panels 300. For this reason, the respective loading panels 300 are moved to different positions in the vertical direction by the respectively connected moving modules 420, so that the luggage A seated on the loading panels 300 can be arranged in the vertical direction.

Accordingly, when the loading of the luggage A in the loading space 110 of the mobility 100 is completed, the moving module 420 connected to the loading panel 300 is moved in the vertical direction along the guide rail 410, and thus, the luggage A loaded on the loading panel 300 is arranged upward. In addition, another luggage A is put into the lower side of the loading panel 300 on which the luggage A is loaded, and the position of the loading panel 300 that has completed the loading is moved upward, so that the loading space 110 is vertically divided, and each of the luggage A is vertically arranged.

On the other hand, in the mobility 100, an uppermost end of the loading space 110 or a bottom of each loading panel 300 is provided with a sensor S that measures the distance between the uppermost end and the luggage A at the lower side or the distance between the loading panel and other loading panel 300. When the second moving module 400 moves the loading panel 300 in the vertical direction, the distance between the uppermost end of the loading space 110 and the luggage A, or the distance between the loading panel 300 and the luggage A measured by the sensor S is less than a set distance, the movement of the corresponding loading panel 300 is stopped.

Here, the above-described first moving module 200 and second moving module 400 are controlled by a controller, and the controller receives information through the sensor S. Such a controller is configured with a general electrical control structure, and the description thereof including drawings is omitted.

The sensor S according to an embodiment of the present disclosure is installed at the uppermost end of the loading space 110 and at the bottom of each loading panel 300 to measure the distance between the uppermost end and the luggage A at the lower side or between the loading panels 300. An IR sensor may be applied to the sensor S, and the distance information between the uppermost end and the luggage A positioned at the lower side of the uppermost end of the loading space 110 or between the loading panels 300 or between the luggage A positioned on the lower side of a specific loading panel 300, or between respective loading panels 300 can be collected by the sensor S.

Therefore, when the second moving module 400 moves the loading panel 300 in the vertical direction to arrange the luggage A loaded on the loading panel 300, if the distance between the uppermost end of the loading space 110 and the luggage A or the distance between the loading panel 300 and the luggage A measured by the sensor S is less than a set distance, the second moving module 400 stops the movement of the corresponding loading panel 300 under the control by the controller. Here, the set distance is a value determined through an experiment in advance and stored in the controller, and may be set so that the luggage A or the loading panel 300 does not collide with each other.

Accordingly, when the loading panel 300 is vertically moved by the second moving module 400, the collision between the luggage A or the loading panels 300 is avoided to prevent damage to the luggage A, and the moving operation of each loading panel 300 may be stably performed.

On the other hand, as shown in FIG. 9, the luggage loading method includes a setting step (S10) of setting a loading order according to the information of the luggage A; a loading step (S20) of loading each luggage A into the loading space 110 by the first moving module 200 according to the loading order; and an arrangement step (S30) of moving the loading panel 300 disposed at the uppermost end among the plurality of loading panels 300 upward when the bottom surface of the loading space 110 is saturated with the luggage A. In one example, the method may be performed by the controller and various components described above operated according various instructions received from the controller.

Here, in the setting step (S10), the loading order may be set according to the size of the luggage A and the delivery order of the luggage A.

That is, in the setting step (S10), the loading order is determined according to the size of the luggage A and the delivery order of the luggage A. In addition, in the setting step (S10), the loading order of the luggage A to be loaded in the loading space 110 of the mobility 100 may be determined in consideration of the delivery location information of the luggage A and the movement path of the mobility 100.

In this way, when the loading order of the luggage A is determined by the setting step (S10), in the loading step (S20), the luggage A is loaded in the loading space 110 by the first moving module 200 according to the loading order. In this case, the loading order may be the reverse of the unloading order in the loading space 110 of the mobility 100.

In this way, the luggage A is loaded on the bottom surface of the loading space 110 in the loading step (S20), and if the loaded luggage A is saturated, the arrangement step (S30) of moving the loading panel loaded with the luggage A among the plurality of loading panels 300 upward is performed.

That is, in the arrangement step (S30), when the luggage A is moved on the bottom surface of the loading space 110 by the first moving module 200 and the loading is completed, the second moving module 400 is operated so that the loading panel 300 of the uppermost end where the loading of the luggage A is completed is moved upward, and then the luggage A can be additionally loaded onto the bottom surface of the loading space 110.

Referring to FIG. 8, when the loading of the luggage A on the bottom surface of the loading space 110 is completed, the loading panel 300 is moved upward, so that each loading space 110 is moved upward and additional luggage A can be loaded. In addition, as each loading panel 300 is aligned upward in the loading space 110, each luggage A is arranged, and the loading amount of the luggage A can be secured.

In addition, in the arrangement step (S30), if, based on the information on the distance between the uppermost end of the loading space 110 and the luggage A or the distance between the loading panel 300 and the luggage A, the distance between the uppermost end of the loading space 110 and the luggage A or the distance between the loading panel 300 and the luggage A is less than the set distance, the movement of the corresponding loading panel 300 is stopped.

As such, when the loading panel 300 is moved in the vertical direction to arrange the luggage A, if the distance between the uppermost end of the loading space 110 and the luggage A or the distance between the loading panel 300 and the luggage A measured by the sensor S is less than the set distance, the movement of the corresponding loading panel 300 is stopped, thereby preventing a collision between the luggage A or the loading panel 300 and preventing the damage to the luggage A.

As described above, the present disclosure can provide loading and delivery services through S1 to S6 according to the flowchart shown in FIG. 10. In one example, the flowchart of the method may be performed by the controller and various components described above operated according various instructions received from the controller.

That is, in the delivery service of the luggage A, the step (S1) of identifying the size of the luggage A, the delivery order of the luggage A, the delivery location information of the baggage A, and the movement path of the mobility 100 is performed, and the step (S2) of determining the loading order of the luggage A by collecting various information of the luggage A is performed.

Thereafter, the step (S3) of loading the luggage A in the mobility 100 according to the loading order is performed. In this case, when the luggage A is loaded in the loading space 110 of the mobility 100, the step (S4) of stacking the luggage A vertically step by step according to the loading order is performed.

In this way, the loading in the mobility 100 is completed, and the step (S5) of moving the mobility 100 toward the delivery destination through the operation of the mobility 100 is performed, and when the mobility 100 arrives at the delivery destination, the step (S6) of unloading the luggage A after an authentication procedure is performed.

The luggage loading device for mobility having the structure as described above and the luggage loading method for mobility using the same enable the loading and arrangement of the luggage in the loading space 110 of the mobility to be automated, thereby improving loading convenience.

The controller may include a processor or a microprocessor. Optionally, the controller may also include a memory. The aforementioned operations/functions of the controller can be embodied as computer readable code/algorithm/ software stored on the memory thereof which may include a non-transitory computer readable recording medium. The non-transitory computer readable recording medium is any data storage device that can store data which can thereafter be read by the processor or the microprocessor. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc. The processor or the microprocessor may perform the above described operations/functions of the controller, by executing the computer readable code/ algorithm/software stored on the non-transitory computer readable recording medium, so that various instructions may be generated by the processor or the microprocessor and transmitted to various components described above to cause the respective components to perform the respective operations.

Although the present disclosure has been shown and described with reference to specific embodiments, it will be obvious to those of ordinary skill in the art that the present disclosure can be variously improved and changed without departing from the spirit of the present disclosure provided by the following claims.

What is claimed is:

1. A luggage loading device for mobility, comprising:
   a mobility that is provided with a loading space capable of loading luggage;
   a first moving module that is installed on a bottom surface of the loading space to move the luggage to be put into or taken out of the loading space on the bottom surface;
   a loading panel that is provided on an upper side of the first moving module to expose the first moving module while covering the bottom surface of the loading space, and loads the put luggage; and
   a second moving module that is provided in the loading space, is connected to the loading panel and is configured to move the connected loading panel in a vertical direction on the upper side of the first moving module so that the loading panel loaded with the luggage is aligned vertically,
   wherein the second moving module includes a plurality of guide rails that are provided on an inner wall forming the loading space of the mobility and extends in the vertical direction, and a plurality of moving modules that are movably installed along the guide rails and are connected to the loading panel.

2. The luggage loading device for mobility according to claim 1, wherein the first moving module is composed of a plurality of first moving modules and the first moving modules are arranged spaced apart on the bottom surface of the loading space.

3. The luggage loading device for mobility according to claim 1, wherein the first moving module includes a roll housing that extends in a direction perpendicular to a direction in which the luggage is put in or taken out of the loading space and has a recessed groove at the top along the extension direction, and a roller that is seated in the recessed groove of the roll housing and moves in a rolling motion in the recessed groove.

4. The luggage loading device for mobility according to claim 3, wherein the loading space is provided with a driving module that is connected to an end of the roller and rotates the roller when the driving module operates.

5. The luggage loading device for mobility according to claim 4, wherein a plurality of opening holes which are respectively matched to a plurality of the first moving modules and through which the rollers of the respective first moving modules pass are provided on the loading panel.

6. The luggage loading device for mobility according to claim 3, wherein the first moving module further includes a roll cover on which a slit hole matched with the recessed groove and opened to surround a portion of the roller is provided so that when coupled to a top, the roller is prevented from being separated from the recessed groove.

7. The luggage loading device for mobility according to claim 1, wherein the first moving module is composed of a plurality of first moving modules and the first moving modules are arranged to be spaced apart in the loading space in a direction in which the luggage is put or taken out.

8. The luggage loading device for mobility according to claim 1, wherein the loading panel is composed of a plurality of loading panels and the loading panels are stacked in the vertical direction, and the moving module of the second moving module is composed of the plurality of moving modules so as to be connected to the respective loading panels.

9. The luggage loading device for mobility according to claim 8, wherein in the mobility, a sensor is provided on an uppermost end of the loading space or on a bottom of each loading panel to measure a distance between the uppermost end and the luggage at a lower side or between the loading panel and other loading panel, and
when the second moving module moves the loading panel in the vertical direction, if the distance between the uppermost end of the loading space and the luggage or the distance between the loading panel and the luggage measured by the sensor is less than a set distance, the second moving module stops the movement of the corresponding loading panel.

10. A luggage loading device for mobility, comprising:
a mobility that is provided with a loading space capable of loading luggage;
a first moving module that is installed on a bottom surface of the loading space to move the luggage to be put into or taken out of the loading space on the bottom surface;
a loading panel that is provided on an upper side of the first moving module to expose the first moving module while covering the bottom surface of the loading space, and loads the put luggage; and
a second moving module that is provided in the loading space, is connected to the loading panel and is configured to move the connected loading panel in a vertical direction on the upper side of the first moving module so that the loading panel loaded with the luggage is aligned vertically,
wherein the first moving module includes a ball housing having a seating groove at a top, and a support ball that is seated in the seating groove of the ball housing and moves in a rolling motion in the seating groove.

11. The luggage loading device for mobility according to claim 10, wherein the first moving module further includes a ball cover on which a through hole matched with the seating groove and opened to surround a portion of the support ball is provided so that when coupled to the top of the ball housing, the support ball is prevented from being separated from the seating groove.

12. The luggage loading device for mobility according to claim 10, wherein the loading panel includes a plurality of opening holes which are respectively matched to a plurality of the first moving modules and through which the support balls of the respective first moving modules pass.

13. A luggage loading method for operating a luggage loading device for mobility, comprising:
a setting step of setting a loading order according to information of luggage;
a loading step of loading each luggage into loading space by a first moving module according to the loading order; and
an arrangement step of controlling a second moving module to move a loading panel loaded with the luggage upward when a bottom surface of the loading space is saturated with the luggage,
wherein the loading panel is provided on an upper side of the first moving module to exposes the first moving module while covering the bottom surface of the loading space, and loads the luggage,
the second moving module is provided in the loading space, is connected to the loading panel and is configured to move the connected loading panel in a vertical direction on the upper side of the first moving module so that the loading panel loaded with the luggage is aligned vertically, and
the second moving module includes a plurality of guide rails that are provided on an inner wall forming the loading space of the mobility and extends in the vertical direction, and a plurality of moving modules that are movably installed along the guide rails and are connected to the loading panel.

14. The luggage loading method according to claim 13, wherein the setting step comprising: setting the loading order according to a size of the luggage and a delivery order of the luggage.

15. The luggage loading method according to claim 13, wherein when the loading panel is composed of a plurality of loading panels and the loading panels are stacked in the vertical direction, and
the arrangement step further comprises: if a distance between an uppermost end of the loading space and the luggage or a distance between the loading panel and the luggage is less than a set distance based on information according to the distance between the uppermost end of the loading space and the luggage or the distance between the loading panel and the luggage, stopping a movement of the corresponding loading panel.

* * * * *